United States Patent
Xu et al.

(10) Patent No.: US 8,829,112 B1
(45) Date of Patent: Sep. 9, 2014

(54) POLYESTER COMPOSITION RESISTANT TO HYDROLYSIS

(75) Inventors: Jingjing Xu, Wilmington, DE (US); Toshikazu Kobayashi, Chadds Ford, PA (US); Edmund Arthur Flexman, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 224 days.

(21) Appl. No.: 13/564,038

(22) Filed: Aug. 1, 2012

Related U.S. Application Data

(63) Continuation-in-part of application No. 12/351,388, filed on Jan. 9, 2009, now abandoned.

(60) Provisional application No. 61/020,018, filed on Jan. 9, 2008.

(51) Int. Cl.
*C08F 242/00* (2006.01)

(52) U.S. Cl.
USPC .......................................... 525/190; 525/450

(58) Field of Classification Search
CPC ..... C08L 67/04; C08L 79/00; C08L 23/0884; C08K 5/29
USPC ................................. 525/190, 450
See application file for complete search history.

(56) References Cited

U.S. PATENT DOCUMENTS

| 3,193,522 A | 7/1965 | Holtschmidt |
|---|---|---|
| 4,965,302 A | 10/1990 | Hirahara |
| 5,302,694 A | 4/1994 | Buchholz |
| 5,973,024 A | 10/1999 | Imashiro |
| 7,129,190 B2 | 10/2006 | Takahashi |
| 7,153,587 B2 | 12/2006 | Tan |
| 2006/0276617 A1 | 12/2006 | Yano |

FOREIGN PATENT DOCUMENTS

| EP | 1903077 A1 | 3/2008 |
|---|---|---|
| EP | 1967542 A1 | 9/2008 |
| EP | 1975195 A1 | 10/2008 |
| JP | 11-080522 A | 3/1999 |
| JP | 2001-151871 A | 6/2001 |
| JP | 2007-119730 A | 5/2007 |
| JP | 2007-131795 A | 5/2007 |
| JP | 2007284495 A | 11/2007 |
| JP | 2007326940 A | 12/2007 |

OTHER PUBLICATIONS

Michael Lewis, Synergism of Catalysis and Reaction Center Rehybridization. An ab Iniitio Study of the Hydrolysis of the Parent Carbodiimide J. Am. Chem. Soc. 1998, 120, 8541-8542.

*Primary Examiner* — Edward Cain

(57) ABSTRACT

A composition comprises or is produced from polyester, a first modifier, and a second modifier wherein the first modifier includes a polymer that is incompatible with poly(hydroxyalkanoic acid) and is not an acid-containing or acid generating polymer. Also disclosed is an article comprising or produced from the composition. Further disclosed is a process combining a first modifier, a second modifier, or both, with a poly(hydroxyalkanoic acid) to produce the composition and optionally injection molding or thermoforming the composition into the article.

20 Claims, No Drawings

POLYESTER COMPOSITION RESISTANT TO HYDROLYSIS

This application is a continuation-in-part of application Ser. No. 12/351,388, filed Jan. 9, 2009, now pending, which claims priority to U.S. provisional application 61/020,018, filed Jan. 9, 2008; the entire disclosures of both prior applications are incorporated herein by reference.

The invention relates to a composition comprising polyester and one or more modifiers and to an article resistant to hydrolysis.

BACKGROUND OF THE INVENTION

Polyester includes aliphatic polyesters and semi-aromatic polyesters. Poly(hydroxyalkanoic acid) (PHA), such as poly (lactic acid) (PLA) and poly(hydroxy butyrate), is an aliphatic polyester comprising renewable monomer such as production by bacterial fermentation processes or isolated from plant matter that include, but not limited to, corn, sugar beets, or sweet potatoes. There is a growing demand of or interest in such bio-based polymers such as automotive application, consumer products and as disposable packaging material.

The resin can be used for thermoformed or injection molded articles such as in automotive parts, computer housing or other electronic parts, machine parts, and packaging articles such as cups, trays, and clam shells, and automotive parts such as dash board. Under the humid and elevated temperature conditions, PHA can be susceptible to hydrolysis, which can lead to degradation of their physical properties. At high temperature, water or water vapor hydrolyzes the ester bond and initially forms carboxyl and hydroxyl end groups. The hydroxyl groups and the carboxyl end groups on the ends of the polymer chain may accelerate further hydrolysis. This behavior restricts the use of PHA. Under such conditions, the mechanical and electrical properties of PHA can be deteriorated. This may be a problem in using PHA to produce certain articles for use in applications including electronic products and auto parts, where the connectors and parts are likely to be used in a humid and high temperature environment. There is therefore a need or desire to produce such articles comprising PHA having improved hydrolytic stability.

SUMMARY OF THE INVENTION

A composition comprises, consists essentially of, consists of, or is produced from polyester, a first modifier, and a second modifier wherein the first modifier can include a polymer that is incompatible with the poly(hydroxyalkanoic acid) and is not an acid-containing polymer or acid-generating polymer and the second modifier can include polycarbodiimide, carbodiimide, diimide compound, or combinations of two or more thereof. Also provided is an article comprising or produced from the composition.

A process comprises contacting a polyester with a first modifier to produce a mixture; combining the mixture with a second modifier to produce a composition; and optionally injection molding or thermoforming the composition into an article wherein the first modifier and the second modifier, are each as disclosed above; and each modifier is present in an amount that effects the resistance of the article to hydrolysis or scavenges the content of ambient acid, ambient moisture, or in both of the polyester or the article.

A process comprises contacting a polyester with a second modifier to produce a mixture; combining the mixture with a first modifier to produce a composition; and optionally injection molding or thermoforming the composition into an article wherein the first modifier and the second modifier, are each as disclosed above; and each modifier is present in an amount that effects the resistance of the article to hydrolysis or scavenges the content of ambient acid, ambient moisture, or in both of the polyester or the article.

A process comprises contacting a polyester with a first modifier in a first location of an extruder to produce a mixture; introducing a second modifier in a second location which is down stream of the first location to produce a composition; and optionally injection molding or thermoforming the composition into an article wherein the first modifier and the second modifier, are each as disclosed above; and each modifier is present in an amount that effects the resistance of the article to hydrolysis or scavenges the content of ambient acid, ambient moisture, or in both of the polyester or the article.

A process comprises combining a first modifier and a second modifier to produce a masterbatch modifier; combining the masterbatch modifier or a portion thereof with a polyester to produce a composition; and optionally injection molding or thermoforming the composition into an article.

The article can be a film or sheet. The process can further comprise injection molding or thermoforming the film or sheet into a second article.

DETAILED DESCRIPTION OF THE INVENTION

Trademarks or tradenames are present in upper case letters.

Polyester includes aromatic polyester, semi-aromatic polyesters and aliphatic polyester. Semi-aromatic polyester includes a polycondensation product of an aromatic acid or salt thereof or ester thereof and an alcohol or its ester forming equivalent where the acid can include phthalic acid, isophthalic acid, terphthalic acid, sulfobenzenedicarboxylic acid, or combinations of two or more thereof and the alcohol can include ethylene glycol, propylene glycol, butylene glycol, trimethylene glycol, tetramethylene glycol, hexamethylene glycol, or combinations of two or more thereof. Example of semi-aromatic polyester includes, for example, polyethylene terephthalate, polypropylene terephthalate, polybutylene terephthalate, and blends of two or more thereof PHA is well-known aliphatic polyester and is used to illustrate, but not to be construed as to limit the scope of, the invention. PHA can include polymers comprising repeat units derived from one or more hydroxyalkanoic acids having 2 to 15, 2 to 10, 2 to 7, or 2 to 5, carbon atoms. Examples include glycolic acid, lactic acid (2-hydrorxypropanoic acid), 3-hydroxypropionate, 2-hydroxybutyrate, 3-hydroxybutyrate, 4-hydroxybutyrate, 3-hydroxyvalerate, 4-hydroxyvalerate, 5-hydroxyvalerate, 6-hydroxyhexanoic acid, 3-hydroxyhexanoic acid, 4-hydroxyhexanoic acid, 3-hydroxyheptanoic acid, or combinations of two or more thereof. Examples of polymers include poly(glycolic acid), poly(lactic acid) and poly(hydroxybutyrate) (PHB), polycaprolactone (PCL), or combinations of two or more thereof, including blends of two or more PHA polymers (e.g., blend of PHB and PCL) that are desirably not amorphous. Stereo isomers and combinations in blends or block copolymers thereof are also included.

PHA can be produced by bulk polymerization or synthesized through the dehydration-polycondensation of the hydroxyalkanoic acid, dealcoholization-polycondensation of an alkyl ester of polyglycolic acid, or by ring-opening polymerization of a cyclic derivative such as the corresponding lactone or cyclic dimeric ester. See, e.g., US2668162, U.S. Pat. No. 3,297,033, JP03-502115A, JP07-26001A, and JP07-53684A.

PHA also includes copolymers comprising more than one PHA, such as polyhydroxybutyrate-hydroxyvalerate copolymers and copolymers of glycolic acid and lactic acid. Copolymers can be produced by copolymerization of a polyhydroxyalkanoic acid or derivative with one or more cyclic esters and/or dimeric cyclic esters. Such comonomers include glycolide (1,4-dioxane-2,5-dione), dimeric cyclic ester of glycolic acid, lactide (3,6-dimethyl-1,4-dioxane-2,5-dione), α,α-dimethyl-β-propiolactone, cyclic ester of 2,2-dimethyl-3-hydroxy-propanoic acid, β-butyrolactone, cyclic ester of 3-hydroxybutyric acid, δ-valerolactone, cyclic ester of 5-hydroxypentanoic acid, ε-caprolactone, cyclic ester of 6-hydroxyhexanoic acid, and lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., cyclic ester of 12-hydroxydodecanoic acid, and 2-p-dioxanone, cyclic ester of 2-(2-hydroxyethyl)-glycolic acid, or combinations of two or more thereof.

PHA may also include copolymers of one or more PHA monomers or derivatives with other comonomers, including aliphatic and aromatic diacid and diol monomers such as succinic acid, adipic acid, and terephthalic acid and ethylene glycol, 1,3-propanediol, and 1,4-butanediol. About 100 different comonomers have been incorporated into PHA polymers. Generally, copolymers having the more moles of comonomer(s) incorporated, the less likely the resulting copolymer is to crystallize.

PHA polymers and copolymers may also be made by living organisms or isolated from plant matter. For example, copolymer poly(3-hydroxybutyrate/3-hydroxyvalerate) has been produced by fermentation of the bacterium *Ralstonia eutropha*. Fermentation and recovery processes for other PHA types have also been developed using a range of bacteria including *Azotobacter*, *Alcaligenes latus*, *Comamonas testosterone* and genetically engineered *E. coli* and *Klebsiella*. U.S. Pat. No. 6,323,010 discloses a number of PHA copolymers prepared from genetically modified organisms.

Poly(glycolic acid) can be synthesized by the ring-opening polymerization of glycolide and is sometimes referred to as poly-glycolide.

PLA includes poly(lactic acid) homopolymers and copolymers of lactic acid and other monomers containing at least 50 mole % (50% comonomer gives the least likely copolymer composition to crystallize, no matter what conditions) of repeat units derived from lactic acid or its derivatives (mixtures thereof) having a number average molecular weight of 3000 to 1000000, 10000 to 700000, or 20000 to 300000. PLA may contain at least 70 mole % of repeat units derived from (e.g. made by) lactic acid or its derivatives. The lactic acid monomer for PLA homopolymers and copolymers can be derived from d-lactic acid, 1-lactic acid, or combinations thereof. A combination of two or more PLA polymers can be used. PLA may be produced by catalyzed ring-opening polymerization of the dimeric cyclic ester of lactic acid, which is frequently referred to as "lactide." As a result, PLA is also referred to as "polylactide".

PLA also includes the special class of copolymers and blends of different stereo-isomers of lactic acid or lactide. Melt blends of PLA polymerized from d-lactic acid or d-lactide and PLA polymerized from 1-lactic acid or 1-lactide can give a stereo-complex between the two stereopure PLAs at a 50/50 ratio. Crystals of the stereo-complex itself has a much higher melt point than either of the two PLA ingredients. Similarly stereo-block PLA can be solid state polymerized from low molecular weight stereo-complex PLA.

Copolymers of lactic acid are typically prepared by catalyzed copolymerization of lactic acid, lactide or another lactic acid derivative with one or more cyclic esters and/or dimeric cyclic esters as described above.

The composition may comprise, based on the total composition weight, about 0.01 to about 40, about 0.05 to about 30, about 0.1 to about 20, about 0.5 to about 5%, about 0.2 to about 10, or about 5 to about 10% of the first modifier; and about 0.01 to about 40, about 0.05 to about 30, about 0.1 to about 20, about 0.2 to about 10, or about 0.5 to about 5%, or about 0.5 to about 3% of the second modifier.

The first modifier can be any polymer that is incompatible with a PHA (e.g., PLA) and is not an acid-containing polymer, acid-generating polymer, or combinations thereof. The first modifier the first modifier optionally may have a glass transitional temperature (Tg) below 105° C. or well below 105° C. and can be below 95° C., 85° C., 75° C., 65° C., or 50° C.

A polymer such as poly(methyl methacrylate) that is compatible with PLA is not desired. The term "incompatible" has the meaning known to one skilled in the art. For example, Grant & Hackh's Chemical Dictionary (1987) defines "incompatible" as "applied to a substance which for chemical, physical, physiological reasons cannot be mixed with another without a change in the nature or effect of either". It could be synonymous to "immiscible" or "two phased" when applied two or more polymers. In the case of PHA, one desires to have PHA and the first modifier to form a two phased structure so there exists shear between the two phases to better disperse the second modifier.

Any copolymer containing repeat units derived from methyl methacrylate is preferably or essentially excluded from the composition. As such, the composition disclosed herein preferably or essentially does not contain a methacrylate resin comprising a comonomer derived from methyl methacrylate. The term "essentially" means less than less 1% or 0.5%, or even free of, such resins. Accordingly, the composition preferably or essentially cannot comprise more than one methacrylic resin or two or more methacrylic resins having a difference in Tg of 10° C. or more, in syndiotacticity of 3% or more, or in both these Tg and syndiaticity characteristics. A methacrylic resin, as disclosed herein, is a polymer derived from methyl methacrylate.

The first polymer can include the first modifier is ethylene copolymer, copolyetherester, epoxidized oil, acrylonitrile styrene copolymer, a styrene-containing polymer, aromatic polyester, aliphatic-aromatic polyester, ethylene propylene diene monomer rubber, polyolefin, or combinations of two or more thereof the copolyetherester comprises a multiplicity of recurring long-chain ester including the polyether segments units and short-chain ester units joined head-to-tail through ester linkages; the ethylene copolymer comprises repeat units derived from ethylene and vinyl acetate, (meth)acrylate, an epoxy-containing (meth)acrylate, or combinations of two or more thereof; The ethylene copolymer may comprise repeat units derived from ethylene and a comonomer where the comonomer includes one or more olefins of the formula $CH_2=C(R^1)CO_2R^2$ or carbon monoxide and one or more optional epoxy-containing comonomer having the formula of $CH_2=C(R^3)CO_2R^4$ where $R^1$ is hydrogen or an alkyl group with 1 to 8 carbon atoms and $R^2$ is an alkyl group with 1 to 8 carbon atoms, such as methyl, ethyl, or butyl; $R^3$ is hydrogen or an alkyl group with 1 to 6 carbon atoms, such as methyl, and $R^4$ is glycidyl. Repeat units derived from ethylene may comprise, based on the copolymer weight, from about 20, 40 or 50% to about 80, 90 or 95%. The comonomer can be methyl acrylate, ethyl acrylate, propyl acrylate, butyl acrylate, methacrylate, CO, or combinations of two or more thereof and, when present, may comprise, based on the copolymer weight, from about 3, 15 or 20% to about 35, 40 or 70%. Examples of epoxy-containing comonomer include glycidyl acrylate, glycidyl methacrylate, glycidyl acrylate, or combinations of two or more thereof. Repeat units derived from epoxy-containing comonomer may comprise from about 0.5, 2, or 3% to about 17, 20, or 25%. One or more of n-butyl acrylate, tert-butyl acrylate, iso-butyl acrylate, and sec-butyl acrylate may be used.

Examples of ethylene copolymer include those derived from ethylene and methyl acrylate, ethylene and ethyl acrylate, ethylene and methacrylate, ethylene and butylacrylate, ethylene and glycidyl methacrylate, and ethylene, butyl acrylate, and glycidyl methacrylate, or combinations of two or more thereof.

Copolyetherester includes one or more copolymers having a multiplicity of recurring long-chain ester units and short-chain ester units joined head-to-tail through ester linkages. The long-chain ester unit comprises repeat units of —OGO—C(O)RC(O)— and the short chain ester unit comprises repeat units of —OGO—C(O)RC(O)—. G is a divalent radical remaining after the removal of terminal hydroxyl groups from poly(alkylene oxide)glycols having a number average molecular weight of between about 400 and about 6000, or preferably between about 400 and about 3000. R is a divalent radical remaining after removal of carboxyl groups from a dicarboxylic acid having a molecular weight of less than about 300. D is a divalent radical remaining after removal of hydroxyl groups from a diol having a molecular weight less than about 250.

The copolyetherester may contain about 15 to about 99 weight % short-chain ester units and about 1 to about 85 weight % long-chain ester including the polyether segments units, or from about 25 to about 90 weight % short-chain ester units and about 10 to about 75 weight % long-chain ester units.

The copolyetheresters are disclosed in US patents including U.S. Pat. No. 3,651,014, U.S. Pat. No. 3,766,146, and U.S. Pat. No. 3,763,109, the disclosures of which are incorporated herein by reference. A commercially available copolyetherester is HYTREL® from (E. I. du Pont de Nemours and Company (DuPont), Wilmington, Del. Others include ARNITEL® from DSM in the Netherlands and RITEFLEX® from Ticona, USA.

Epoxidized oil may contain one or more internal oxirane groups and may, but not always, contain some unsaturation where the oxirane group is not bonded to the terminal or end carbon atom of the oil molecule. The epoxidized oils may be derived from plants such as vegetables, animals, or petroleum and may include glycerides of various fatty acids such as linseed oil, which is a glyceride of linolenic, oleic, and linoleic unsaturated acids, and saturated fatty acids. The fatty acids may contain about 10 to about 35 carbon atoms.

Styrene-containing polymers can include acrylonitrile styrene copolymer, acrylonitrile butadiene styrene copolymer, styrene-isoprene-styrene copolymer, styrene-hydrogenated isoprene-styrene copolymer, styrene-butadiene-styrene copolymer, styrene-hydrogenated butadiene-styrene copolymer, styrenic block copolymer, polystyrene. All such styrene-containing polymers are well known to one skilled in the art, the description of which is omitted herein for the interest of brevity. For example, acrylonitrile butadiene styrene, or ABS, is a terpolymer made by polymerizing styrene and acrylonitrile in the presence of polybutadiene. The proportions can vary from 15 to 35% acrylonitrile, 5 to 30% butadiene and 40 to 60% styrene. The result is a long chain of polybutadiene criss-crossed with shorter chains of poly(styrene acrylonitrile). ABS can be used between −25 and 60° C.

EPDM (ethylene propylene diene monomer rubber) is a well-known elastomer and the description of which is therefore omitted.

Polyolefin includes those well known polyethylene (PE) such as linear high density PE or polypropylene. Similar ethylene based soft polyolefins can be prepared and used by copolymerizing ethylene with other unsaturated olefin monomers including, but not limited to, propylene, butene, octene, and the like such as ENGAGE® from Dow Chemical, Midland, Mich.

Other suitable first modifier can include well known aromatic polyester or aliphatic-aromatic polyester disclosed above and can include polyethylene terephthalate, polybutylene terephthalate, polypropylene terephthalate, or combinations of two or more thereof.

A carbodiimide comprises the functionality $(N\!\!=\!\!C\!\!=\!\!N)_n$ (n is a number ranging from about 1 or about 2 to about 20) and can hydrolyze to form urea. Compounds containing the carbodiimide functionality are dehydration agents, often used to activate carboxylic acids towards amide or ester formation. Examples of carbodiimide include N,N'-dicyclohexylcarbodiimide, N,N'-diisopropylcarbodiimide, 1-ethyl-3-(3-dimethyl aminopropyl) carbodiimide hydrochloride, N,N'-diphenylcarbodiimide, N,N'-di-2,6-diisopropylphenylcarbodiimide, or combinations of two or more thereof. Carbodiimide is well known to one skilled in the art and can be formed by dehydration of urea or from thiourea or the method disclosed in U.S. Pat. No. 7,129,190, the entire disclosure is herein incorporated by reference.

A carbodiimide compound includes naphthalene diimide, perylene diimide, perylene tetracarboxylic diimide, any one disclosed in U.S. Pat. No. 4,965,302, or combinations of two or more thereof. A carbodiimide compound may be produced by subjecting various kinds of polyisocyanates to a decarboxylation condensation reaction with an organophosphorus compound or an organometal compound as a catalyst, at temperature of not lower than about 70° C. or any methods known to one skilled in the art. See, e.g., U.S. Pat. No. 7,129,190, U.S. Pat. No. 4,965,302, and Bull. Soc. Chim. France, 727-732 (1951). Commercially available carbodiimides include STABAXOL® from Rhein Chemie Corporation, USA and CARBODILITE® from Nisshinbo Ind. Inc.

A PHA composition can comprise one or more additional additives including plasticizers, stabilizers, antioxidants, ultraviolet light absorbers, hydrolytic stabilizers, anti-static agents, dyes or pigments, fillers, fire-retardants, lubricants, reinforcing agents, processing aids, antiblock agents, release agents, and/or combinations of two or more thereof. Reinforcing agents include glass fibers, glass flakes, mica, wollastonite, mica, natural fibers, synthetic resin fibers, or combinations of two or more thereof.

One or more of these additives may be present in the compositions, by weight, from 0.01 to 50%, 0.01 to 7%, or 0.01 to 5%. For example, the compositions may contain from about 0.5 to about 5% plasticizer; from about 0.1 to about 5% antioxidants and stabilizers; 0.05 to 0.5% wax, from about 3 to about 20% other solid additives such as natural fiber; from about 0.5 to about 10% nanocomposite; and/or from about 1 to about 20 weight % flame retardants. Examples of suitable other solid additives include pigments such as titanium oxide, carbon, graphite, one or more silicates, or transition metal oxide.

The PHA composition may further comprise one or more reinforcement fibers disclosed above or additional polymers such as a polyolefin including polyethylene, polypropylene, acrylonitrile butadiene styrene rubber, polycarbonate, polyamide, an ethylene copolymer, or combinations of two or more thereof. The polyethylene and polypropylene can include any known homopolymers and copolymers. If the PHA composition is used in a multilayer structure, the additional polymer can also be a separate layer laminated to the PHA layer.

The polyester or PHA composition can be produced by any means known to one skilled in the art.

For example, a PHA may be first mixed with a first modifier to produce a mixture by any methods known to one skilled in the art such as being mixed to substantially dispersed or homogeneous using a melt-mixer such as a single or twin-screw extruder, blender, Buss Kneader, double helix Atlantic mixer, Banbury mixer, roll mixer, etc., to give a PHA composition. The mixing also can include a melt-mixing temperature in the range above the softening point of the PHA and below the depolymerization temperature of the PHA of about 100° C. to about 400° C., about 170° C. to about 300° C., or especially about 180° C. to about 230° C. at an ambient pressure or in the range of 0 to about 60 MPa or 0 to about 34 MPa. Any suitable equipment can be used for melt mixing such as a single screw extruder, counter rotating twin screw extruder, roll mill, bilobal twin screw extruder, single screw extruder with mixing torpedoes at the end of the screw. Alternatively, a portion of the component materials can be mixed in a melt-mixer, and the rest of the component materials subsequently added and further melt-mixed until substantially dispersed or homogeneous to the naked eye.

The first mixture can be combined with a second modifier to produce a composition as disclosed above and can be carried out in a different extruder. The composition can be injection molded or thermoformed into an article.

Alternatively, a PHA can be first mixed with a second modifier to produce a first mixture followed by mixing with a first modifier to produce the composition.

Also alternatively, a PHA can be mixed with a first (or second) modifier in a first location of an extruder to produce a mixture as disclosed above. The first location can be a feed hop or a first barrel or a first feed port of the extruder. Thereafter, a second modifier (or first modifier, if the first mixture includes the second modifier) can be combined with, added to, or injected into, at a different location of the extruder, but downstream to the first location. The process can be repeated or can include more than one first location and more than one second location.

Less desirable is a 1 step process in which PHA, first modifier, and second modifier are combined at once to produce a PHA composition. Each of the modifiers is present in an amount that is sufficient to affect the resistance of the PHA composition or an article therefrom to hydrolysis or scavenge of the content of ambient acid, ambient moisture, or both of the composition or the article. They also may provide other useful functionality to the final composition, such as toughening or rheological modification.

All combinations can be carried out by simple mixing by any means known to one skilled in the art such as that disclosed above.

After a composition is produced, it may be formed (cut) into pellets or other particles for feeding to a melt forming machine.

Melt forming can be carried out by the usual methods for thermoplastics, such as injection molding, thermoforming, or extrusion, or any combination of these methods. Some of the ingredients, e.g., plasticizers and lubricants (mold release), may also be added at one or more downstream points in the extruder to decrease attrition of solids such as fillers, and/or improve dispersion, and/or decrease the thermal history of relatively thermally unstable ingredients, and/or decrease losses by evaporation of volatile ingredients.

The composition may be formed into films or sheets by extrusion through either slot dies to prepare cast films or sheets or annular dies to prepare blown films or sheets followed by thermoforming into articles and structures that are oriented from the melt or at a later stage in the processing of the composition.

The film may be a single layer of the PHA composition (a monolayer sheet) or a multilayer film or sheet comprising a layer of the PHA composition and at least one additional layer comprising a different material.

For packaging applications, a multilayer film may involve three or more layers including an outermost structural or abuse layer, an inner or interior barrier layer, and an innermost layer making contact with and compatible with the intended contents of the package and capable of forming any needed seals. Other layers may also be present to serve as adhesive layers to help bond these layers together. The thickness of each layer can range from about 10 to about 200 μm.

A multilayer film can be produced by any methods well known to one skilled in the art such as, for example, coextrusion and can be laminated onto one or more other layers or substrates. Other suitable converting techniques are, for example, blown film (co)extrusion and extrusion coating.

Films can be used to prepare packaging materials such as containers, pouches and lidding, balloons, labels, tamper-evident bands, or engineering articles such as filaments, tapes and straps. Films may also be slit into narrow tapes and drawn further to provide fibers.

The film or sheet may be further thermoformed into articles. The mold can be any mold known to one skilled in the art. For example, a mold can be made with aluminum and can be used for stretching by application of vacuum from inside the mold to a heated sheet of PHA covering the top of the mold.

The composition may also be molded into a shaped article using any suitable melt-processing technique such as injection molding, extrusion molding, blow molding, and thermoforming.

Examples of articles that include, but are not limited to, such as automobile parts, electrical or electronical parts or connectors, mechanical machine parts, parts' housings, trays, cups, caps, bowls, lids, knobs, buttons, clam shells, profile extruded articles, cartons, squeezable tubes, components of containers, or disposable eating utensils.

Individual components comprising the composition may be made by heating the composition above the melting point (or glass transition temperature if the PHA is amorphous) of the PHA and then cooling them below the melting point to solidify the composition and formed a shaped part. Preferably, the part is cooled at least 50° C. below the melting point, more preferably at least 100° C. below the melting point. Most commonly, ultimately the composition will be cooled to ambient temperature, most typically 15-45° C.

The composition may further comprise one or more other polymers and/or fillers such as clay, natural fiber, glass fiber, or combinations of two or more thereof.

The following Examples are illustrative, and are not to be construed as limiting the scope of the invention.

EXAMPLES

PLA3001D pellets were purchased from NatureWorks LLC (Minnetonka, Minn. USA).

ELVALOY® EP 4934-9, an ethylene butyl acrylate glycidyl methacrylate copolymer (EBAGMA), was obtained from DuPont (28 wt % butyl acrylate and 12 wt % glycidyl methacrylate).

Ethylene methyl acrylate (EMA) was obtained from DuPont (24 wt % methyl acrylate) as ELVALOY® AC1224.

IRGANOX® 1010 was an antioxidant obtained from Ciba Specialty Chemicals (Tarrytown, N.Y. USA).

Wax OP was a lubricant manufactured by Clariant Corp (Muttenz, Switzerland).

STABAXOL® P was a polycarbodiimide obtained from Rhein Chemie Corporation (Mannheim, Germany).

HYTREL® 4056 was a copolyetherester elastomer with melting point of 150 deg C. and nominal Durometer D Hardness of 40D from DuPont.

ECOFLEX F BX7011 was a polyester obtained from BASF (Ludwigshafen, Germany).

KRATON D1107 was a styrene-isoprene-styrene block copolymer obtained from the Kraton Polymers (Houston, Tex., USA).

ALATHON L5845 was a high density polyethylene obtained from LyondellBasell Industries (Houston, Tex., USA).

MARLEX HGX 030 was a polypropylene homopolymer obtained from Phillips Sumika polypropylene Company (The Woodlands, Tex.).

SAN was a styrene acrylonitrile copolymer with a weight average molecular weight of 165,000 and 25 weight % of acrylonitrile from Aldrich.

MAGNUM 941 was an acrylonitrile butadiene styrene copolymer obtained from Dow Chemical (St. Louis, Mo., USA).

PMMA was a poly(methyl methacrylate) with an average molecular weight of 35,000 from Scientific Polymer Products, Ontario, N.Y., USA.

KRATON FG 1910 was a styrene-ethylene butylene-styrene block copolymer with maleic anhydride grafted onto the rubber mid-block. It was obtained from the Kraton Polymers (Houston, Tex., USA).

SURLYN 9910 was a zinc ionomer of an ethylene methacrylic acid copolymer from DuPont.

PARALOID EXL 3330 was a pelletized butyl acrylate-based core shell copolymer from Rohm-Haas (Philadelphia, Pa., USA).

Methods

All polyester resins were dried at 90° C. for 12 hours prior to extrusion and prior to molding. Other materials were used as received unless otherwise noted.

Polymer compositions were prepared by compounding in a 30 mm Coperion twin screw extruder (Coperion Inc., Ramsey, N.J.). Unless noted, all the ingredients were added through the rear feed throat (barrel 1) of the extruder. For the 2-addition process, STABAXOL® P was side-fed into barrel 5 (of 9 barrels). Barrel temperatures were set between 170 and 190° C., resulting in melt temperatures 190-225° C. depending on the composition and extruder rate and the screw rpm.

The resultant compositions were molded into 4 mm ISO all-purpose bars. The test pieces were used to measure mechanical properties on samples at 23° C. and dry as molded. The following test procedures were used.

Tensile strength and elongation at break: ISO 527-1/2 at an extension rate of 50 mm per minute.

PCT test: Test bars were also conditioned in an autoclave at 121° C. at $2.01 \times 10^5$ Pa, and 100% relative humidity for 3, 10, and 20 hours. Mechanical properties were measured on the conditioned test bars and the results were compared to the properties of the unconditioned bars. The mechanical properties of the conditioned bars and the percentage retention of the physical properties are given in the tables. A greater retention of physical properties indicates better hydrolysis resistance.

Table 1 shows the compositions of 8 experimental runs.

TABLE 1

| Component | Exam 1 | Exam 2 | Exam 3 | Examp4 | Exam 5 | Exam 6 | Exam 7 | Exam 8 |
|---|---|---|---|---|---|---|---|---|
| | | | | Weight % | | | | |
| PLA 3001D | 86.6 | 86.6 | 86.6 | 86.6 | 86.6 | 86.6 | 86.6 | 86.6 |
| IRGANOX ® 1010 | 0.3 | 0.3 | 0.3 | 0.3 | 0.3 | 0.3 | 0.3 | 0.3 |
| Wax OP | 0.1 | 0.1 | 0.1 | 0.1 | 0.1 | 0.1 | 0.1 | 0.1 |
| STABAXOL ® P | 3 | 3 | 3 | 3 | 3 | 3 | 3 | 3 |
| EBAGMA(12% GMA) | 10 | | | | | | | |
| EMA | | 10 | | | | | | |
| KRATON D1107 | | | 10 | | | | | |
| ECOFLEX F BX 7011 | | | | 10 | | | | |
| ALATHON L5845 | | | | | 10 | | | |
| MARLEX 030 | | | | | | 10 | | |
| SAN | | | | | | | 10 | |
| MAGNUM 941 | | | | | | | | 10 |

Table 2 below shows 6 comparative runs.

TABLE 2

| Component | Comp. ex. 1 | Comp. ex. 2 | Comp. ex. 3 | Comp. ex. 4 | Comp. ex. 5 | Comp. ex. 6 |
|---|---|---|---|---|---|---|
| | | | Weight % | | | |
| PLA 3001D | 96.6 | 89.6 | 86.6 | 86.6 | 86.6 | 86.6 |
| IRGANOX ® 1010 | 0.3 | 0.3 | 0.3 | 0.3 | 0.3 | 0.3 |
| Wax OP | 0.1 | 0.1 | 0.1 | 0.1 | 0.1 | 0.1 |
| STABAXOL ® P | 3 | | 3 | 3 | 3 | 3 |
| EBAGMA (12% GMA) | | 10 | | | | |
| PMMA | | | 10 | | | |
| KRATON FG 1910 | | | | 10 | | |
| SURLYN 9910 | | | | | 10 | |
| Paraloid EXL 3330 | | | | | | 10 |

Table 3 and 4 respectively show the physical properties of the Table 1 and 2 runs.

TABLE 3

|  | Exam 1 | Exam 2 | Exam 3 | Exam 4 | Exam 5 | Exam 6 | Exam 7 | Exam 8 |
|---|---|---|---|---|---|---|---|---|
| Initial tensile strength in mPa measured using PCT test at 120° C. | | | | | | | | |
| Tensile Strength (mPa) | 54.8 | 55.7 | 52.5 | 60.57 | 56.2 | 61.0 | 55.9 | 59.5 |
| Elongation (%) | 9.7 | 8.4 | 4.5 | 8.7 | 4.3 | 4.1 | 2.5 | 3.1 |
| Tensile strength in mPa measured using PCT test at 120° C. after 20 hours | | | | | | | | |
| Tensile Strength | 46.6 | 43.2 | 41.4 | 33.3 | 38.2 | 35.6 | 37.4 | 44.8 |
| elongation | 3.5 | 3.4 | 3.0 | 1.8 | 2.4 | 2.4 | 1.4 | 2.2 |
| Retention after 20 hours (% of initial) | | | | | | | | |
| Tensile Strength | 85 | 78 | 78 | 55 | 68 | 58 | 67 | 75 |
| Elongation | 36 | 40 | 66 | 21 | 57 | 58 | 56 | 69 |

The results in Table 3 show that after aging for 20 hours in a pressure cooker, PLA composition comprising both carbodiimide and EBAGMA (Example 1), both carbodiimide and EMA (Example 2), and both carbodiimide and KRATON D 1107 (Example 3) retained 85%, 78%, and 78%, respectively, of the initial tensile strength and 36%, 40%, and 66%, respectively, of the initial elongation.

TABLE 4

|  | Comp ex. 1 | Comp ex. 2 | Comp ex. 3 | Comp ex. 4 | Comp ex. 5 | Comp ex. 6 |
|---|---|---|---|---|---|---|
| Initial tensile strength in mPa measured using PCT test at 120° C. | | | | | | |
| Tensile Strength (mPa) | 69.8 | 56.1 | 69.5 | 55.3 | 51.9 | 54.7 |
| Elongation (%) | 5.2 | 15 | 7.0 | 7.2 | 11.9 | 3.09 |
| Tensile strength in mPa measured using PCT test at 120° C. after 20 hrs | | | | | | |
| Tensile Strength | broke | broke | 0.6 | broke | broke | broke |
| elongation | broke | broke | 0.1 | broke | broke | broke |
| Retention after 20 hours (% of initial) | | | | | | |
| Tensile Strength | 0 | 0 | 0.9 | 0 | 0 | 0 |
| Elongation | 0 | 0 | 1.2 | 0 | 0 | 0 |

Table 4 shows that all comparative examples except comparative example 3 lost their initial tensile strength and elongation. Example 1, containing both carbodiimide and EBAGMA, had higher retention than comparative Example 1 (carbodiimide only) or comparative example 2 (EBAGMA only). The results demonstrate synergistic effect of carbodiimide and EBAGMA.

In separate runs, several processing conditions were used to make compositions as shown in Table 5.

TABLE 5

| | Run Number** (weight %) | | | | | |
|---|---|---|---|---|---|---|
| Component* | 9*** | 10**** | 11***** | 12****** | 13 | 14 |
| PLA 3001D | 87.6 | 87.6 | 87.6 | 87.6 | 87.6 | 87.6 |
| STABAXOL ® P | 2.0 | 2.0 | 2.0 | 2.0 | | |
| EBAGMA | 10.0 | 10.0 | 10.0 | 10.0 | | |
| Wax OP | 0.1 | 0.1 | 0.1 | 0.1 | 0.1 | 0.1 |
| IRGANOX ® 1010 | 0.3 | 0.3 | 0.3 | 0.3 | 0.3 | 0.3 |
| F* | | | | | 12 | |
| G* | | | | | | 12 |

*F = 83% EBAGMA/16.7% STABAXOL ® P/0.3% IRGANOX ® 1010 masterbatch and G = HYTREL 10 MS (HYTREL 4056/20% STABAXOL P masterbatch).
**The numbers in the table are weight % of each component.
***(Process 1) 1-step 1-addition extrusion where all components were added to the extruder at the same time;
****(Process 2) 2-step extrusion where EBAGMA and PLA3001D as well as additives were first mixed in an extruder to produce a mixture followed by the second extrusion of STABAXOL ® P with the mixture
*****(Process 3) 2-step extrusion where STABAXOL ® P and PLA3001D as well as additives were first mixed in an extruder to produce a mixture followed by the second extrusion of EBAGMA with the mixture.
******(Process 4) 1-step 2-addition extrusion using a long extruder with 9 barrels where EBAGMA and PLA3001D as well as additives were first mixed in the barrel 1 and STABAXOL ® P were added to barrel 5.

Table 6 shows that, changing processing conditions can affect the properties of the PLA composition. For example, after 20 hours PCT, PLA composition made in a 1-step 1-addition process (Example 9) lost all of its initial tensile strength and elongation and is not preferred. PLA compositions prepared by other processes (Examples 10 thru 14), retained some of the initial tensile strength and elongation after the 20 hours PCT test. Table 6 also shows that PLA compositions made from the masterbatch (Runs 13 and 14) had the best retention of tensile strength. Electronic microscopic result revealed that the dispersion of the modifier(s) varies for the samples made by different processes. Improved dispersion facilitates the immediate acid scavenge and possibly enhances the hydrophobicity of the composition or article made therefrom. Thus the hydrolysis resistance can be affected by the processing conditions used.

TABLE 6

| | Run Number | | | | | |
|---|---|---|---|---|---|---|
| | 9 | 10 | 11 | 12 | 13 | 14 |
| Tensile strength in mPa measured using PCT test at 120° C. | | | | | | |
| initial | 56.2 | 55.7 | 55.2 | 56.3 | 54.2 | 58.6 |
| 15 hours | 9.48 | — | — | — | — | — |
| 20 hours | broke | 15.0 | 0.12 | 24.6 | 38.0 | 25.6 |
| % Tensile strength retained after 20 hours | | | | | | |
| Retention | | | | | | |
| 15 hours | 17 | — | — | — | — | — |
| 20 hours | 0 | 27 | 0.2 | 44 | 70 | 44 |
| Elongation (% Strain) | | | | | | |
| initial | 15.4 | 31.5 | 8.0 | 4.1 | 7.4 | 10.4 |
| 15 hours | 0.41 | — | — | — | — | — |
| 20 hours | Broke | 1.2 | 5.6 | 2.5 | 2.6 | 1.7 |
| Elongation Retention (%) | | | | | | |
| Retention | | | | | | |
| 15 hours | 3 | — | — | — | — | — |
| 20 hours | 0 | 4 | 69 | 60 | 35 | 17 |

The invention claimed is:

1. A composition comprising or produced from poly(hydroxyalkanoic acid), a first modifier, and a second modifier wherein
    the composition does not comprise a methacrylic resin containing repeat unit derived from methyl methacrylate;
    the poly(hydroxyalkanoic acid) comprises repeat units derived from a hydroxyalkanoic acid having 2-10 carbon atoms;
    the first modifier is a polymer that is incompatible with the poly(hydroxyalkanoic acid) and is not an acid-containing polymer or acid-generating polymer;
    the first modifier is selected from the group consisting of ethylene copolymer, copolyetherester, epoxidized oil, acrylonitrile styrene copolymer, a styrene-containing polymer, aromatic polyester, aliphatic-aromatic polyester, ethylene propylene diene monomer rubber, and combinations of two or more thereof;
    the ethylene copolymer comprises repeat units derived from ethylene and a comonomer selected from the group consisting of methyl acrylate, ethyl acrylate, propyl acrylate, butyl acrylate, CO, glycidyl acrylate, glycidyl methacrylate, glycidyl acrylate, butyl acrylate glycidyl methacrylate, and combinations of two or more thereof;
    the copolyetherester comprises a multiplicity of recurring long-chain ester including the polyether segments units and short-chain ester units joined head-to-tail through ester linkages; and
    the second modifier includes polycarbodiimide, carbodiimide, diimide compound, or combinations thereof.

2. The composition of claim 1 wherein
    the poly(hydroxyalkanoic acid) comprises repeat units derived from a hydroxyalkanoic acid including glycolic acid, lactic acid, 3-hydroxypropionate, 2-hydroxybutyrate, 3-hydroxybutyrate, 4-hydroxybutyrate, 3-hydroxyvalerate, 4-hydroxyvalerate, 5-hydroxyvalerate, 6-hydroxyhexanoic acid, 3-hydroxyhexanoic acid, 4-hydroxyhexanoic acid, 3-hydroxyheptanoic acid, or combinations of two or more thereof; and
    the second modifier includes the polycarbodiimide or carbodiimide.

3. The composition of claim 2 wherein
    the poly(hydroxyalkanoic acid) comprises repeat units derived from hydroxyalkanoic acid having five or fewer carbon atoms;
    the first modifier is the ethylene copolymer; and
    the second modifier is polycarbodiimide or carbodiimide including N,N'-dicyclohexylcarbodiimide, N,N'-diisopropylcarbodiimide, 1-ethyl-3-(3-dimethyl aminopropyl) carbodiimide hydrochloride, N,N'-diphenylcarbodiimide, N,N'-di-2,6-diisopropylphenylcarbodiimide, or combinations of two or more thereof.

4. The composition of claim 3 wherein
    the hydroxyalkanoic acid is glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid, or combinations of two or more thereof.

5. The composition of claim 2 wherein
    the poly(hydroxyalkanoic acid) is poly(glycolic acid), poly(lactic acid), poly(hydroxy-butyric acid), poly(hydroxybutyrate-valerate) copolymer, glycolic acid lactic acid copolymer, polyhydroxybutyrate-hydroxyvalerate copolymer, or combinations of two or more thereof;
    the first modifier is selected from the group consisting of ethylene methyl acrylate copolymer, ethylene ethyl acrylate copolymer, ethylene methacrylate copolymer, ethylene butyl acrylate copolymer, ethylene glycidyl methacrylate copolymer, ethylene butyl acrylate glycidyl methacrylate terpolymer, styrenic block copolymer, acrylonitrile styrene copolymer, acrylonitrile butadiene styrene copolymer, styrene-isoprene-styrene copolymer, styrene-hydrogenated isoprene-styrene copolymer, styrene-butadiene-styrene copolymer, styrene-hydrogenated butadiene-styrene copolymer, polystyrene, semi-aromatic polyester, aliphatic-aromatic polyester, polyolefin, polyolefin elastomer, and combinations of two or more thereof.

6. The composition of claim 5 wherein the poly(hydroxyalkanoic acid) is poly(lactic acid) and the second modifier is polycarbodiimide or the carbodiimide.

7. The composition of claim 6 wherein the first modifier is styrenic block copolymer, acrylonitrile styrene copolymer, acrylonitrile butadiene styrene copolymer, or styrene-isoprene-styrene copolymer.

8. The composition of claim 6 wherein the first modifier is copolymer of the ethylene butyl acrylate glycidyl methacrylate terpolymer.

9. The composition of claim 6 wherein the first modifier is the ethylene methyl acrylate copolymer.

10. The composition of claim 6 wherein the first modifier is the polyolefin or the polyolefin elastomer.

11. A process comprising producing a composition and optionally injection molding or thermoforming the composition into an article wherein the producing comprises
- (1) contacting the poly(hydroxyalkanoic acid) with the first modifier to produce a mixture and combining the mixture with the second modifier to produce the composition, or
- (2) contacting the poly(hydroxyalkanoic acid) with the second modifier to produce a mixture and combining the mixture with the first modifier to produce the composition, or
- (3) contacting the poly(hydroxyalkanoic acid) with the first modifier in a first location of an extruder to produce a first mixture; introducing the second modifier in a second location down stream of the first location to produce; combining the second modifier with the first mixture to produce the composition, or
- (4) combining a first modifier and a second modifier to produce a masterbatch modifier; combining the masterbatch modifier or a portion thereof with the poly(hydroxyalkanoic acid) to produce the composition;

the poly(hydroxyalkanoic acid), the first modifier, and the second modifier, are each as recited in claim 1; and each modifier is present in an amount that effects the resistance of the article to hydrolysis or scavenges the content of ambient acid, ambient moisture, or in both of the poly(hydroxyalkanoic acid) or the article.

12. The process of claim 11 wherein the poly(hydroxyalkanoic acid) comprises repeat units derived from a hydroxyalkanoic acid including glycolic acid, lactic acid, 3-hydroxypropionate, 2-hydroxybutyrate, 3-hydroxybutyrate, 4-hydroxybutyrate, 3-hydroxyvalerate, 4-hydroxyvalerate, 5-hydroxyvalerate, 6-hydroxyhexanoic acid, 3-hydroxyhexanoic acid, 4-hydroxyhexanoic acid, 3-hydroxyheptanoic acid, or combinations of two or more thereof; and the second modifier includes the polycarbodiimide or carbodiimide.

13. The process of claim 12 wherein the poly(hydroxyalkanoic acid) comprises repeat units derived from hydroxyalkanoic acid having five or fewer carbon atoms;

the first modifier is the ethylene copolymer; and the second modifier is polycarbodiimide or carbodiimide including N,N'-dicyclohexylcarbodiimide, N,N'-diisopropylcarbodiimide, 1-ethyl-3-(3-dimethyl aminopropyl) carbodiimide hydrochloride, N,N'-diphenylcarbodiimide, N,N'-di-2,6-diisopropylphenylcarbodiimide, or combinations of two or more thereof.

14. The process of claim 13 wherein the poly(hydroxyalkanoic acid) comprises repeat units derived from glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid, or combinations of two or more thereof; and the first modifier is the copolymer of ethylene, n-butyl acrylate, and glycidyl methacrylate or copolymer of ethylene and methyl acrylate.

15. The process of claim 14 wherein the poly(hydroxyalkanoic acid) comprises the poly(lactic acid); the first modifier is the ethylene copolymer, and the second modifier is the polycarbodiimide or the carbodiimide.

16. The process of claim 15 wherein the process comprises contacting the poly(hydroxyalkanoic acid) with the first modifier to produce a mixture and combining the mixture with the second modifier to produce the composition.

17. The process of claim 15 wherein the process comprises contacting the poly(hydroxyalkanoic acid) with the second modifier to produce a mixture and combining the mixture with the first modifier to produce the composition.

18. The process of claim 15 wherein the process comprises contacting the poly(hydroxyalkanoic acid) with the first modifier in a first location of an extruder to produce a first mixture; introducing the second modifier in a second location downstream to the first location; and combining the second modifier with the first mixture to produce the composition.

19. The process of claim 15 wherein the process comprises combining a first modifier and a second modifier to produce a masterbatch modifier; combining the masterbatch modifier or a portion thereof with the poly(hydroxyalkanoic acid) to produce the composition.

20. An article comprising or produced from a poly(hydroxyalkanoic acid) composition wherein the article includes automotive parts, auto interior electrical and electronic parts, machine parts, packaging articles, or combinations of two or more thereof and the composition is as recited in claim 1.

* * * * *